/ United States Patent                                [15]   3,680,095
Evans                                                                [45]   July 25, 1972

[54] AUTOMATIC DETECTION CRITERIA CONTROL UNIT FOR PENCIL BEAM RADARS

[72] Inventor: Norol T. Evans, San Pedro, Calif.
[73] Assignee: Hughes Aircraft Company, Culver City, Calif.
[22] Filed: April 17, 1967
[21] Appl. No.: 631,307

[52] U.S. Cl.............................................343/7 A, 343/5 DP
[51] Int. Cl................................................................G01s 9/02
[58] Field of Search..........................................343/5 DP, 7 A

[56] References Cited

UNITED STATES PATENTS 3,487,405   12/1969   Molho et al.......................343/5 DP X
3,611,369   10/1971   Maguire................................343/5 DP
3,214,754   10/1965   Hildebrandt..........................343/5 DP
3,312,969   4/1967    Halsted................................343/5 DP Primary Examiner—T. H. Tubbesing
Attorney—James K. Haskell and Walter J. Adam

[57] ABSTRACT

An automatic detection criteria control system for pencil beam radar in which video returns are coded and correlated to provide target reports. The amplitude of the coded returns from each range bin is subject to modification as a function of the history of target detection in an incremental volume of space which includes the particular range bin. The system includes a memory in which a target-detection-history indicating code is stored for each incremental volume. The code is read out, in real time, with the video returns from all range bins of a given incremental volume. The codes are updated during a sequence of update cycles to indicate the latest history of target detection in each incremental volume.

20 Claims, 14 Drawing Figures

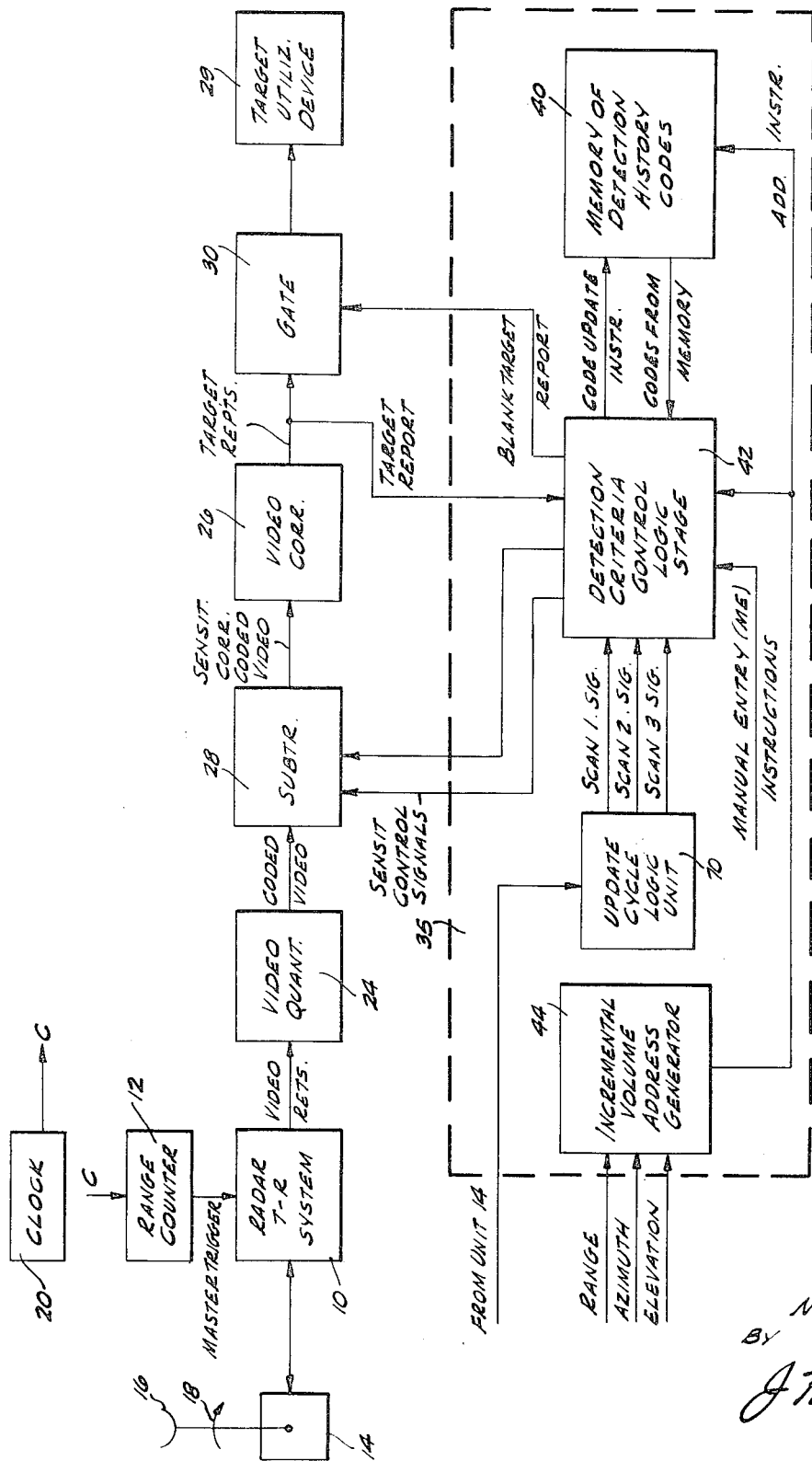

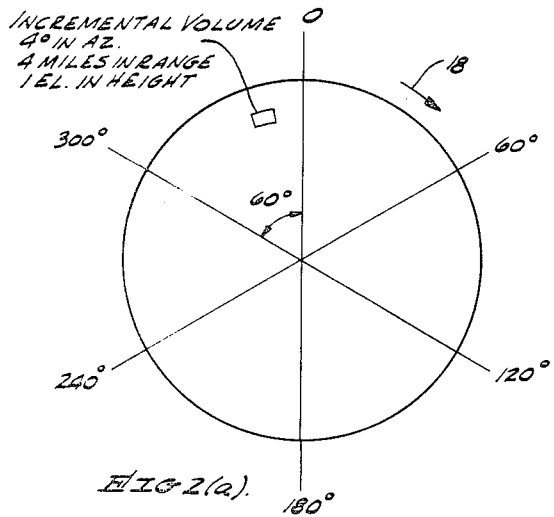
FIG. 2(a).
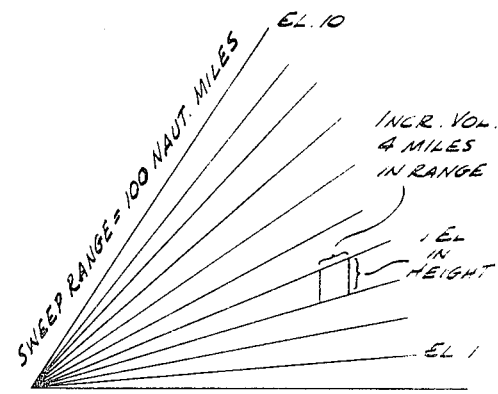
FIG. 2(b).
| TYPE | ACCEPTABLE HIT PATTERN |
|---|---|
| 1 | [3 3 / 3 3] [  / 3 3 / 3 3] |
| 2 | (multiple 3x3 patterns with 1,2,3) |
| 3 | [2 2 / 2 1] [2 2 / 1 2] [2 1 / 2 2] [1 2 / 2 2] |
FIG. 4.
| CODED VIDEO | RELATIVE AMPLITUDE OF PEAK VIDEO RETURNS (X) WITH RESPECT TO RMS NOISE |
|---|---|
| 0 0 0 | $X < 3\,db$ |
| 0 0 1 | $3 \leq X < 6\,db$ |
| 0 1 0 | $6 \leq X < 9\,db$ |
| 0 1 1 | $9 \leq X < 12\,db$ |
| 1 0 0 | $12 \leq X < 18\,db$ |
| 1 0 1 | $18 \leq X < 27\,db$ |
| 1 1 0 | $27 \leq X < 39\,db$ |
| 1 1 1 | $39 \leq X\,db$ |
FIG. 3.

| CODE NO. | CODE | | | | | CODE INTERPRETATION |
|---|---|---|---|---|---|---|
| 1 | 0 | 0 | 0 | 0 | 0 | NO DET. IN PRIOR UPDATE CYCLE |
| 2 | 0 | 0 | 0 | 1 | 0 | REDUCE SENS. BY 1 (3db) |
| 3 | 0 | 0 | 1 | 0 | 0 | " " BY 2 (6db) |
| 4 | 0 | 0 | 1 | 1 | 0 | BLANK TARGET REPORTS |
| 5 | 0 | 0 | 0 | 0 | 1 | DET. IN PRIOR UPDATE CYCLE |

FIG. 5.

| CODE MODIFICATION DURING SCAN #1 OF UPDATE CYCLE | | | | | | | | | | | | | | |
|---|---|---|---|---|---|---|---|---|---|---|---|---|---|---|
| READOUT CODES | | | | | LOGIC PERFORMED | WRITE IN CODES | | | | | | | | |
| | | | | | | NO DET. | | | | | DETECTION | | | |
| 0 | 0 | 0 | 0 | 0 | NO ACTION | 0 | 0 | 0 | 0 | 0 | 0 | 0 | 0 | 0 |
| 0 | 0 | 0 | 1 | 0 | NO ACTION | 0 | 0 | 0 | 1 | 0 | 0 | 0 | 1 | 1 |
| 0 | 0 | 1 | 0 | 0 | SUBTRACT 1 | 0 | 0 | 1 | 0 | 0 | 0 | 1 | 0 | 1 |
| 0 | 0 | 1 | 1 | 0 | SUBTRACT 2 | 0 | 0 | 1 | 1 | 0 | 0 | 1 | 1 | 1 |
| 0 | 0 | 0 | 0 | 1 | NO ACTION | 0 | 0 | 0 | 0 | 1 | 0 | 0 | 0 | 1 |

FIG. 6.

| CODE MODIFICATION DURING SCAN #2 OF UPDATE CYCLE | | | | | | | | | | | | | | |
|---|---|---|---|---|---|---|---|---|---|---|---|---|---|---|
| READOUT CODES | | | | | LOGIC PERFORMED | WRITE IN CODES | | | | | | | | |
| | | | | | | NO DET. | | | | | DETECTION | | | |
| 0 | 0 | 0 | 0 | 0 | NO ACTION | 0 | 0 | 0 | 0 | 0 | 0 | 1 | 0 | 0 | 0 |
| 0 | 0 | 0 | 1 | 0 | SUBTR. 1 | 0 | 0 | 0 | 1 | 0 | 0 | 1 | 0 | 1 | 0 |
| 0 | 0 | 0 | 1 | 1 | | 0 | 0 | 0 | 1 | 1 | 0 | 1 | 0 | 1 | 1 |
| 0 | 0 | 1 | 0 | 0 | SUBTR. 2 | 0 | 0 | 1 | 0 | 0 | 0 | 1 | 1 | 0 | 0 |
| 0 | 0 | 1 | 0 | 1 | | 0 | 0 | 1 | 0 | 1 | 0 | 1 | 1 | 0 | 1 |
| 0 | 0 | 1 | 1 | 0 | NO ACTION | 0 | 0 | 1 | 1 | 0 | 0 | 1 | 1 | 1 | 0 |
| 0 | 0 | 1 | 1 | 1 | NO ACTION | 0 | 0 | 1 | 1 | 1 | 0 | 1 | 1 | 1 | 1 |
| 0 | 0 | 0 | 0 | 1 | NO ACTION | 0 | 0 | 0 | 0 | 1 | 0 | 1 | 0 | 0 | 1 |

FIG. 7.

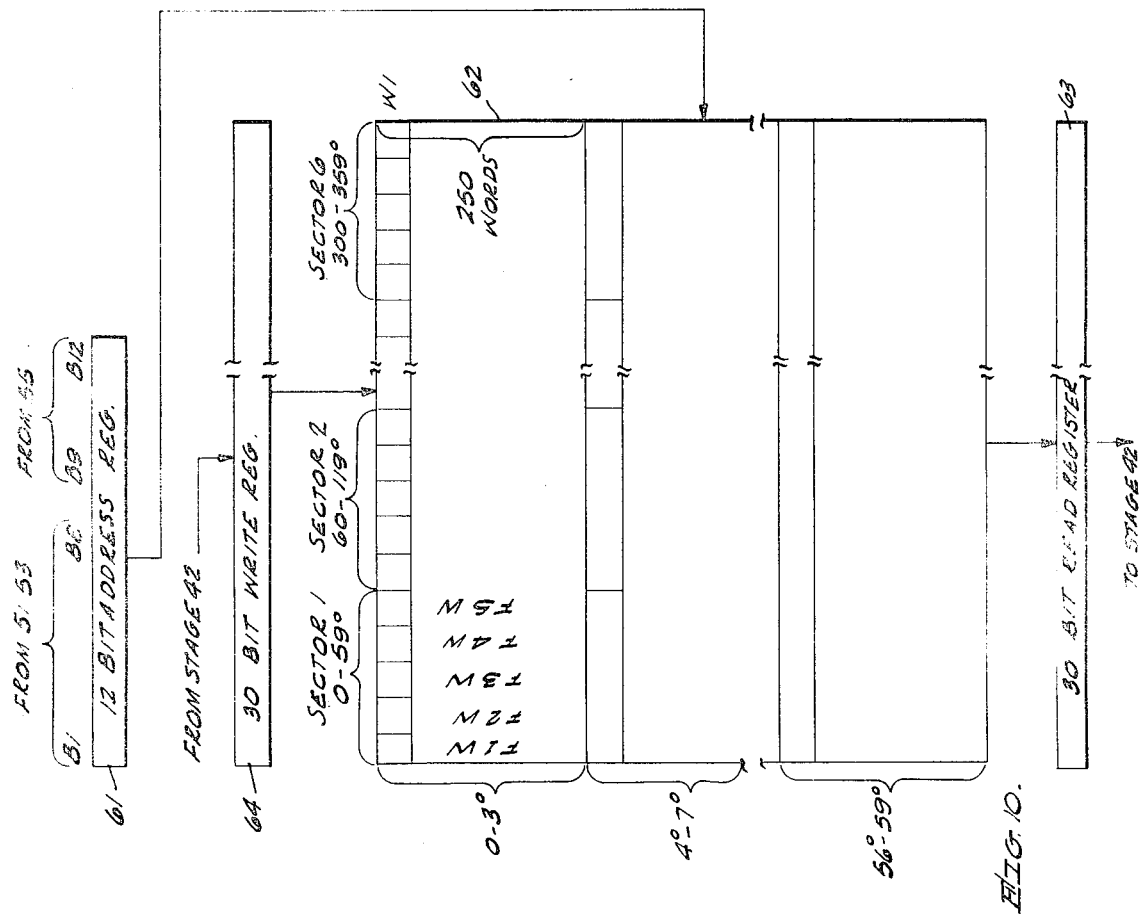

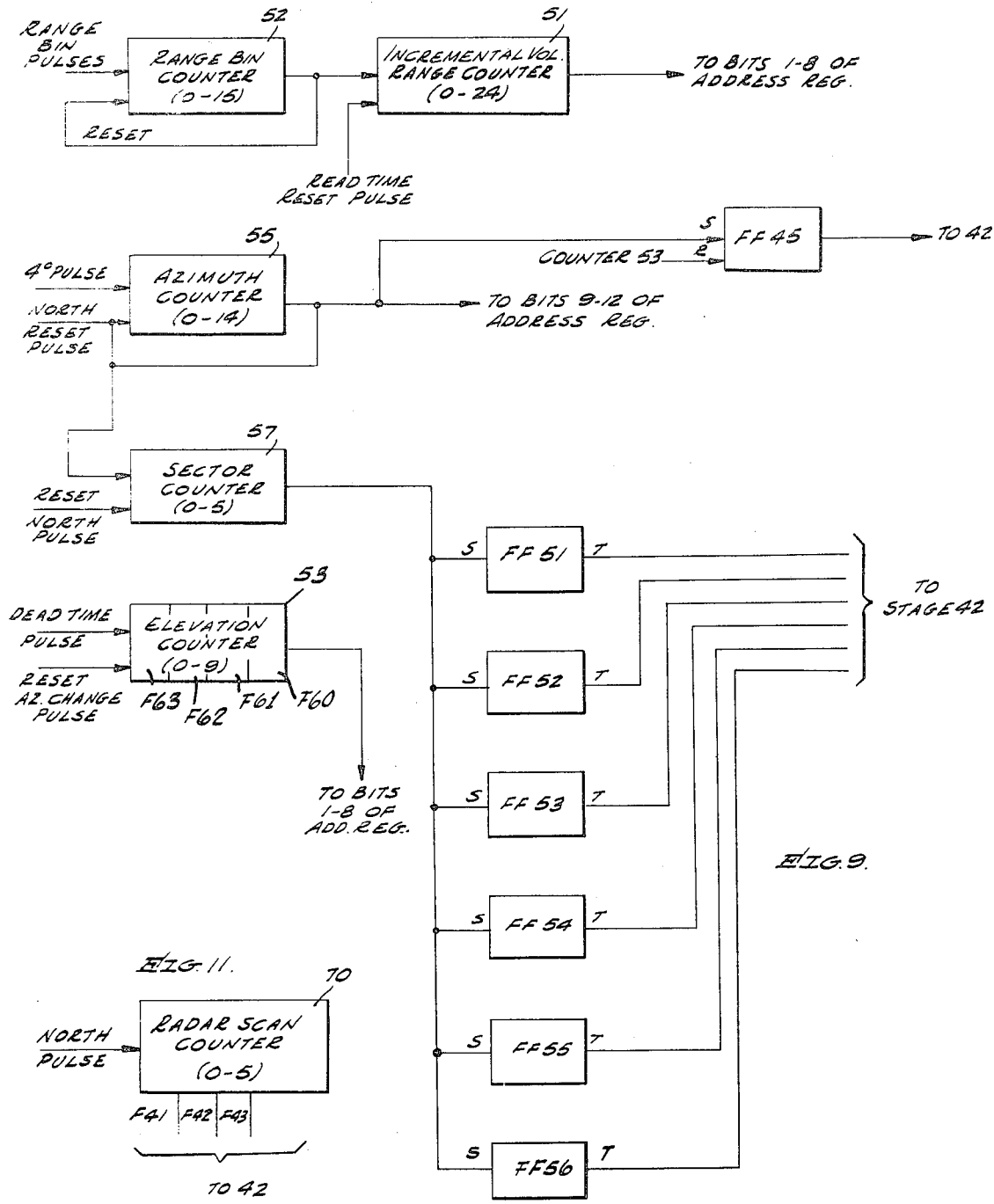

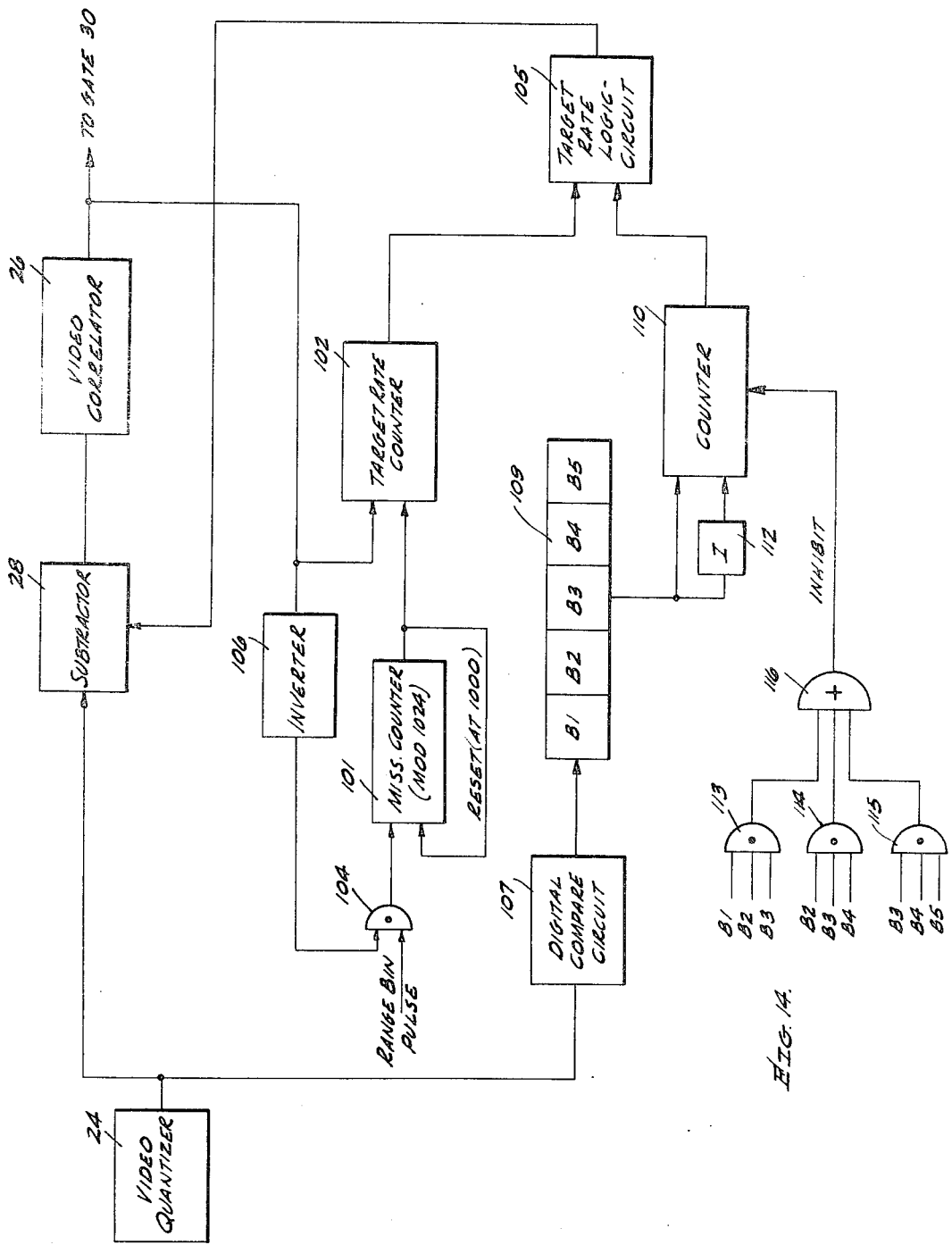

AUTOMATIC DETECTION CRITERIA CONTROL UNIT FOR PENCIL BEAM RADARS

BACKGROUND OF THE INVENTION

1. Field of the Invention

This invention relates to a radar receiving system and, more particularly, to a system for use in a track-while-scan radar system to automatically control the criteria of target detection.

2. Description of the Prior Art

A major problem in automatic detection, acquisition and digital track-while-scan radar systems is the automatic processing of all the video returns from the surveillance radar which is necesSary, to separate meaningful targets which are to be tracked from other targets, without exceeding the system's target storage capacity. At present, nearly every radar system of any degree of complexity employs a computer to process the video returns, which are generally digitized or quantized before being supplied to the computer. The computer memory is also used to store detected targets which are to be followed or tracked.

Any tracking computer that may be used is limited by a maximum number of targets and tracks it can handle. Such limitation is related to the size of the computer memory and to its speed of operation. If the number of targets or tracks which the computer is to handle exceeds its handling capacity, the whole processing system malfunctions to the extent that all the stored data may become essentially useless. Since much of the stored information represents false targets, it can be stated that the price paid for including false target reports is low, as long as the system's maximum storage capacity is not approached. However, once such capacity is approached the cost increases, becoming infinitely high when the capacity is exceeded. Since most false target reports are due to clutter and localized external interference, a basic requirement in advanced radar systems is to automatically reduce the number of false target reports produced by such sources.

OBJECTS AND SUMMARY OF THE INVENTION

Accordingly, it is a primary object of the present invention to provide a novel arrangement, finding particular use in a radar system for minimizing the undesired effect of certain sources of radar signals.

A further object is the provision of a new automatic detection control unit or subsystem for use in a radar target processing system.

Another object of this invention is to provide a novel arrangement with which signals in a radar target processing system are controlled automatically, to reduce the number of false target reports.

Still a further object is to provide a novel target detection criteria control unit which is automatically operated to decrease the number of detected and tracked false targets.

These and other objects of the invention are achieved by providing an automatic detection criteria control unit or subsystem in a radar target processing system. The automatic detection criteria control subsystem, hereafter also referred to as the criteria control subsystem, includes logic and storing circuits which control the effect of incoming video returns on the detection of targets, as a function of previously detected targets from the same volume of space. The invention finds particular utility and therefore will be described in conjunction with a radar system in which video returns are extracted from received radar signals and thereafter quantized before they are correlated to produce target-indicating signals.

The criteria control subsystem of the present invention includes means for storing a multibit code for each incremental volume. The codes represent the history of target detection in the volume. The codes are updated during update cycles which occur at fixed intervals. The updating is based on the presence of a target in the volume during an update cycle and the code prior to the cycle which indicates target detection during prior update cycles.

The system is based on the assumption that a meaningful target, if detected in the volume during one update cycle, would move out of the Volume by the time a subsequent update cycle takes place. Thus, if targets are detected in a given volume during two successive update cycles, the detection sensitivity for the volume is decreased. Alternately stated, the detection criteria is increased or tightened. If after tightening the detection criteria in the particular volume a target is again detected, the criteria is further tightened. Thus the detection criteria for each incremental volume is made a function of the history of target detection therein. Such a system contributes greatly to automatically reducing the number of meaningless targets which may be supplied for storage in the computer, thereby reducing the danger of computer saturation.

The novel features that are considered characteristics of this invention are set forth with particularity in the appended claims. The invention will best be understood from the following description when read in connection with the accompanying drawings.

BRIEF DESCRIPTION OF THE DRAWINGS

FIG. 1 is an overall block diagram of the present invention;

FIGS. 2(a) and 2(b) are diagrams useful in explaining the antenna scan pattern assumed for explaining the invention;

FIG. 3 is a chart of coded video as related to video returns with respect to system RMS noise;

FIG. 4 is a chart, useful in explaining the mode of operation of a video correlator, shown in FIG. 1;

FIGS. 5, 6, 7, and 8 are charts useful in explaining an exemplary embodiment of the invention;

FIG. 9 is a block diagrAm of an address generator, shown in FIG. 1;

FIG. 10 is a block diagram of a memory of detection history codes, shown in FIG. 1;

FIG. 11 is a simple diagram of an update cycle logic unit shown in FIG. 1;

FIG. 14 is a block diagram of another embodiment of the invention.

DESCRIPTION OF THE PREFERRED EMBODIMENTS

Figure 12:
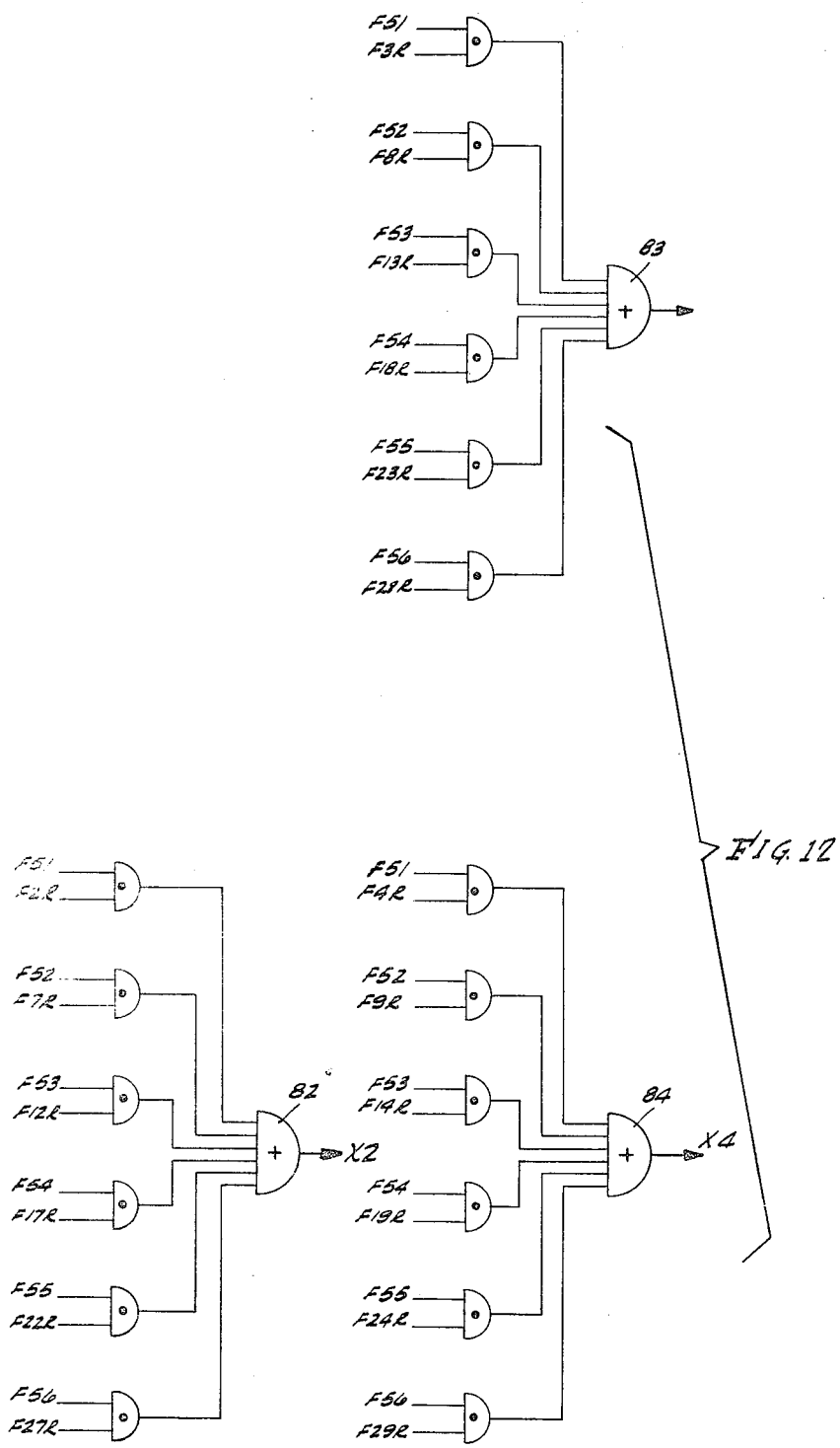
FIGS. 12 and 13 are diagrams of logic circuitry included in a detection criteria control logic stage, shown in FIG. 1.

Reference is now made to FIG. 1 which is a general block diagram of a radar system of the type in which the criteria control system of the present invention may be incorporated. Therein is shown a radar transmitter-receiver (T-R) system 10 which, in synchronism with a master trigger signal, derived from a range counter 12, applies pulses of energy to an antenna control system 14 which includes a rotating surveillance antenna 16. In the following description, it is assumed that the antenna rotates in a horizontal plane in a clockwise direction, as indicated by arrow 18 in FIGS. 1 and 2(a). Each complete revolution represents a complete radar scan. At each of a plurality of azimuth positions, only six of which are shown in FIG. 2(a), pulses of energy are sequentially transmitted into space from the antenna 16 at a plurality of elevations. These pulses and the directions in which they are transmitted and from which reflected signals are received may be thought of as range sweeps.

For explanatory purposes, it is assumed that only 10 range sweeps designated EL1 through EL10 in FIG. 2(b) are transmitted at each azimuth position. The spacing between adjacent azimuth positions is assumed to equal a selected angular spacing, such as 1°. In such a scanning arrangement, during a complete radar scan, pulses or range sweeps are transmitted at 10 elevations in each of 360 azimuth positions.

The range counter 12 (FIG. 1) is assumed to define a plurality of range bins or intervals in space along each range sweep from which reflected energy may be received by the antenna 16. Let each range sweep contain 400 range bins of 3.09 microseconds ($\mu$s) each and that the transmitted energy pulse width is approximately of the same length; since each range bin corresponds to 500 yards range, the length of each range sweep is 100 nautical miles. Pulses necessary to control range counter 12, as well as to various logic circuits, such as gates and flip-flops to be described hereafter in detail, may be provided by a clock 20. The output pulses of clock 20 hereafter referred to as clock pulses are designated by C.

The energy reflected to the antenna 16 from radar targets which may include meaningful targets, such as aircraft, and undesired targets such as clutter, is supplied to system 10. Therein video returns from each range bin are developed at video frequency by mixing and envelope detecting techniques, which are well known in the art. The output of system 10 during each system time period thus represents the video returns from a different range bin.

As is appreciated by those familiar with the art, in advanced track-while-scan radar systems, such video returns are generally first quantized before they are processed or correlated to determine whether they represent meaningful targets to be tracked. In FIG. 1, the video returns from system 10 are shown supplied to a video quantizer 24, the output of which is supplied to a video correlator 26 through a subtractor 28. It is the output of the correlator 26 that represents detected targets or target reports which are generally supplied to a utilization device 29. Such a device may comprise a target display device and/or a target storing memory, used for target tracking. In FIG. 1, the target reports from correlator 26 are shown supplied to device 29 through a gate 30.

The arrangement described so far, except for subtractor 28 and gate 30, is not assumed to be part of the present invention. Rather, it is presented for explanatory purposes as a radar system of the type in which the present invention may be incorporated. As should be appreciated, different quantizing or digitizing techniques may be employed in implementing quantizer 24 to convert the video returns to coded or digitized video. Also, different correlation criteria may be employed in correlator 26 to relate such coded video in determining which coded video should be interpreted to represent a meaningful target report. However, in order to fully describe the present invention, a specific example of a video quantizer and of a video correlator will first be described and thereafter a specific embodiment of the invention will be explained in conjunction with the specific quantizer and correlator. As will become apparent from the following description, the teachings of the invention are not to be limited to such a specific combination which is presented as exemplary of the invention rather than as a limitation thereof.

The video quantizer 24 is assumed to digitize the video returns received from system 10 into 3-bit video codes. The numerical value of each 3-bit code represents the number of decibels (db's) by which the peak of the video returns from each range bin exceeds a preselected threshold level, such as system RMS noise. The actual numerical values of the 3-bit codes which respect to the number of db's by which the peak video returns exceed RMS noise are diagrammed in FIG. 3 in chart form. As seen therefrom, the coded video or output of quantizer 24 is zero (000) when the peak of the video returns from a range bin or interval is less than 3 db's above RMS noise. On the other hand, when the peak video returns from a range bin equals or exceeds RMS noise by 39 db's, the 3-bit code is seven (111), as seen from the last line of FIG. 3. Such a number may be thought of as being a code 7 hit. The other 3-bit numbers in the left column of FIG. 3 represent a code 0 hit, code 1 hit, code 2 hit, etc.

In the absence of the present invention, these 3-bit code hits are directly supplied to the video correlator 26. In one embodiment, the correlator produces a target report only when a plurality of code hits of certain values are present in a plurality of related adjacent range bins, meeting certain designated patterns. This aspect of the exemplary video correlator 26 may better be explained in conjunction with FIG. 4. Therein, each of the diagrammed squares represents a 3×3 range bin matrix. The numbers 1, 2 and 3 represent respectively code 1 hits, code 2 hits and code 3 hits, of the type supplied to the correlator 26 from the quantizer 24.

In the first row of FIG. 4, two acceptable hit patterns of a type 1 are diagrammed. Briefly, video correlator 26 produces a target report for the range bin in the center of each square, if at least a code 3 hit is received from such range bin and in addition, at least a code 3 hit is received from an adjacent range bin which is in the same elevation but in an adjacent azimuth position, as represented by the lefthand square. Also, a target report is produced if an adjacent range bin in the same azimuth position, but at a lower elevation, contains at least a code 3 hit as represented by the righthand square in the first row of FIG. 4.

Other acceptable hit patterns which cause the correlator 26 to produce target reports are diagrammed in the other rows of FIG. 4. In a type 2 of acceptable hit patterns, a target report is produced if the range bin in the matrix center contains at least a code 3 hit and a code 2 hit and a code 1 hit are in two adjacent range bins. Type 3 of acceptable hit patterns consists of at least a code 2 hit in the center range bin and two code 2 hits and one code 1 hit in three other range bins in one corner of the 3×3 range bin matrix.

From reducing such a processing system to practice as part of a pencil beam radar system, it has been found that the probability of detection of meaningful targets is greatly enhanced. However, concurrently therewith, it has been established that the number of false target reports from each azimuth scan may further be reduced if the sensitivity of detecting targets in each incremental volume of the total radar surveillance volume is related to the history of target detection from such an incremental volume. It is to provide an arrangement capable of automatically controlling the detection sensitivity in each incremental volume that the present invention is primarily directed.

Reference is made again to FIGS. 1, 2(a) and 2(b). In FIG. 1, the criteria control system of the present invention is diagrammatically represented by the subtractor 28 and gate 30, herebefore referred to, and by the various blocks surrounded by dashed lines 35. Briefly, the entire radar surveillance volume as represented by the plan and side views of FIGS. 2(a) and 2(b) respectively, is divided into incremental volumes. In the present description, it is assumed that each incremental volume is 4° in azimuth [FIG. 2(a)], 4 miles in range [FIGS. 2(a) and 2(b)] and 1 elevation in height. Recalling that each range bin is 1° in azimuth, 500 yards in range and 1 elevation in height, each incremental volume in essence includes 4×16 = 64 range bins. A target is assumed to be detected in an incremental volume if correlator 26 produces a target report for any one of the range bins in the incremental volume.

As seen from FIG. 1, the system of the present invention includes a memory of detection history codes 40 and a detection criteria control logic stage 42. Briefly, the memory 40 stores a multibit code, for example 5 bits, for each incremental volume of the radar surveillance volume. This code represents the prior history of detected targets or target reports from any of the range bins in the particular incremental volume. For explanatory purposes, the 5-bit code may be thought of as representing the target detection history of the incremental volume.

The 5-bit code of each incremental volume is read out from memory 40 to logic stage 42 in real time with the incoming coded video of all of the range bins comprising the incremental volume. An incremental volume address generator 44 (FIG. 1) which receives range, azimuth and elevation signals as the antenna is rotated in azimuth and elevation, as heretofore described, provides addressing instructions to the memory 40 for such real time code readout. One embodiment of address generator 44 will be described hereinafter in greater detail. These codes are utilized by the logic stage 42 to control the subtractor 28.

The function of stage 42 is to control subtractor 28 to modify the coded video from quantizer 24 received from range bins included in a single incremental volume as a function of the 5-bit code of the particular incremental volume. The coded video modification is achieved by subtracting a 1 or 2 from the 3-bit coded video, depending on the target detection history of the volume. From the foregoing description of quantizer 24 and correlator 26, it should be appreciated that by subtracting a 1 or a 2 from a 3-bit coded video, larger peak video returns must be received before a target report is produced by correlator 26. Thus, the subtraction may be thought of as a technique whereby the detection sensitivity is decreased. Also, it may be regarded as a technique of tightening the detection criteria. In some situations, all target reports from all range bins of an incremental area are blanked; that is, prevented from being supplied to the utilization device 29. This is done whenever a target is detected in a volume during each of a preselected number of successive update cycles despite continued tightening of the detection criteria.

The 5-bit code associated with each incremental volume is updated during a multi-scan update cycle which occurs during each of a succession of time intervals such as 1 minute. Thus, at any given time, except during an update cycle, the code represents the target detection history of its volume and is used to control the detection sensitivity of targets from each of the range bins of the incremental volume. Hereafter, for explanatory purposes, the output of correlator 26, in addition to being referred to as a target report, may also be regarded as indicating detection in an incremental volume, if a target report is produced for any of the range bins in the incremental volume.

For a more complete explanation of the use of the 5-bit codes to control the detection sensitivity and the manner in which the codes are updated, reference is first made to FIG. 5 which is a simplified chart of five 5-bit codes and an explanation of what each code represents. The codes, numbered 1 through 5, control the subtractor 28 and the gate 30 in real time as coded video is received from the various range bins.

When coded video is received from a range bin in an incremental volume whose 5-bit code is number 2, logic stage 42 causes subtractor 28 to subtract a 1 from the coded video from quantizer 24. Thus, if the coded video is a code 3 hit, which as seen from FIG. 3 indicates that the peak video exceeds RMS noise by more than 9 db, a 1 is subtracted from the code 3 hit so that only a code 2 hit is supplied to the correlator. As a result, a stricter target detection criteria is applied to all the returns from the particular incremental volume. An even stricter criteria is applied if the 5-bit code of an incremental volume is a code 3, in which case 2 is subtracted from the coded video from quantizer 24.

When an incremental volume is represented by code 4, rather than control subtractor 28, gate 30 (FIG. 1) is closed, blanking or preventing target reports from the correlator from being supplied to utilization device 29. Codes 1 and 5 do not affect the sensitivity of target detection. However, these two codes are used during a subsequent update cycle, during which all the codes are subject to change.

Briefly, the present invention is based on the reasonable assumption that a meaningful target, detected in an incremental volume during one update cycle, would move out of the volume by the time the next update cycle takes place for example, one minute later. If it does not, the code is updated to reduce the detection sensitivity such as by 3 db, in every range bin of the incremental volume, thereby making subsequent detection more unlikely. If detection nevertheless occurs during a subsequent update cycle, in any of the range bins the detection sensitivity for the incremental volume is further reduced. Finally, all target reports are blanked from an incremental volume if, despite the reduction of detection sensitivity of coded video from the volume's range bins by 6 db, target reports are still received from any of the range bins.

Since the size of incremental volumes which further removed from the radar receiver are larger than those closer to it, it may be desirable to update the codes of all volume, beyond a certain range from the receiver at larger intervals than one minute. However, to simplify the following description, it is assumed that the codes of all the incremental volumes are incremented at one minute intervals.

In the exemplary embodiment, the update cycle occurs during three successive radar antenna scans, i.e., three complete revolutions of the antenna 16. The possible code modifications which may take place during scan 1, scan 2 and scan 3 of the update cycle are diagrammed in FIGS. 6, 7 and 8, respectively. In FIGS. 6 and 7, the lefthand column represents the codes which are read out from memory 40 during scans 1 and 2 of the update cycle. The second column headed "LOGIC PERFORMED" indicates some of the logic operations performed by stage 42 during these scans as a function of the read out codes. The next two columns include the codes which are written back into memory 40, depending on whether during the scan, a target report or detection is received from the correlator 26 (FIG. 1).

Summarizing the operation of the system, during scan 1 of an update cycle, if the codes read out are 1 or 5, represented by 00000 and 00001 respectively, they are rewritten into the memory regardlesS of whether a target report or detection is received from any of the range bins of the incremental volume. During scan 1, code 2 does not cause subtractor 28 to reduce the coded video by 1. Codes 3 and 4 cause subtractor 28 to subtract 1 and 2 respectively from the coded video. Also, during scan 1, if the code from memory is a 2, a 3 or a 4, gate 30 is closed, blanking the supply of any target reports to target utilization device 29. If during scan 1, a target report is not received, codes 2, 3 and 4 are rewritten into memory unaltered. However, if during the scan, a target report is received, the codes are modified by setting their least significant digits (LSD) to a "1" state.

From the two righthand columns of FIG. 6, it is seen that eight different codes may be rewritten into the memory 40 at the end of scan 1 of the update cycle. These appear in order in the lefthand column of FIG. 7 as the codes which may be read out during scan 2 of the update cycle. During scan 2, if a code 2, represented by a "1" in the second LSD, is read out, a 1 is subtracted from the coded video from quantizer 24. A 2 is subtracted if the code read out is a 3, as represented by a "1" in the middle or center bit of the 5-bit code. The subtractor 28 does not affect the coded video from the quantizer on codes 1, 4 and 5. Also, if code 4 is read out gate 30 is closed to blank the supply of target reports.

If during scan 2, a target report is not produced by correlator 26, the codes which are read out are rewritten in memory 40 unaltered. However, if a target report is produced, the codes are rewritten with the second most significant digit (MSD) in a "1" state. Such codes are shown in the righthand column of FIG. 7.

Thereafter, during scan 3 of the update cycle, the various codes which may have been rewritten durinG scan 2 are updated as shown in FIG. 8. Therein, in the second column from the right are listed the possible codes which may be readout from the memory. The interpretation of such codes are listed in the lefthand column. The righthand column includes the final updated codes at the end of the update cycle. It should be pointed out that in this column are shown only the five different 5-bit codes listed in FIG. 5. A few interpretations of FIG. 8 are included hereafter for explanatory purposes.

From the first row of FIG. 8, it should be appreciated that if the code at the beginning of the cycle was a 10(00000) and a target report is not received during scan 2, the code is rewritten as a 10(00000) indicating the absence of a target report during the update cycle. If however, a target report is received during scan 2(second row of FIG. 8), the code is updated to 5 (00001) to represent a detection in the update cycle. Similarly, if at the beginning of the cycle the code read out is 5 (the last row) indicating detection during the last update cycle and a target report is received during scan 2, the code is updated to 2 (00010). Consequently, until the next update cycle, the coded video from all range bins in the incremental volume will be modified by the subtractor by subtracting 1 from them and thereby decrease the detection sensitivity or increase the detection criteria. As previously stated, the reasoning underlying such a processing step is based on the assumption that any meaningful target in an incremental volume, detected during one update cycle, would move out of the volume before a subsequent update cycle. However, if it does not, as manifested by the fact that a target report is produced during two successive update cycles, the code associated with the volume is updated to 2 which thereafter reduces a 1 from the coded video and thereby tightens the detection criteria in the volume.

If however, the code at the start of an update cycle is 5 and no target detection occurs during the update cycle (row 15), the code for the volume is updated to 1 (00000), indicating no detection during the last cycle. As a result, the coded video from the volume which is received remains unaffected. Each of the other rows of FIG. 8 represents a different relationship between a code at the start of an update cycle and the updated code as a function of detection, i.e. receipt of a target report during the cycle or the absence thereof.

The teachings herebefore described may be summarized as disclosing a system for controlling the detection criteria of target reports from range bins in an incremental volume as a function of a 5-bit code which represents the target detection history in the volume. The code is updated during each of a succession of update cycles. Between update cycles all coded video from every range bin in the incremental volume is subject to modification as a function of the 5-bit code. The foregoing described codes and the criteria used for updating are based on the assumption that any meaningful target detected in an incremental volume during any given update cycle should move out of the volume by the time the next update cycle takes place, which herebefore, was assumed to be 1 minute. If however, during the next update cycle, a target report is again received, indicating that the target has not moved out, the 5-bit code for the volume is incremented to 2 (FIG. 5) so that all coded video from he incremental volume are reduced by 1. Consequently, a stricter detection criteria is applied to all returns from the volume to detect a target therein.

If, despite the stricter criteria, a target report is produced during the next update cycle, the 5-bit code is raised to 3, further tightening the detection criteria. Finally, all target reports from a volume may be blanked if even after reducing the 3-bit code hits by 2, representing a 6 db reduction, target reports are still produced, Such a capability greatly increases the system's capability to distinguish between meaningful and insignificant targets. By blanking reports from stationary or undesired targets, as well as tightening the detection criteria to eliminate detection of such targets, the number of false target reports supplied to the utilization device is greatly reduced. Consequently, the danger of saturating the device is greatly reduced.

The advantages realized with the present invention are greatly dependent on the fact that the 5-bit code of each incremental volume is read out in real time with the coded video returns from the various range bins comprising the volume. Briefly, this is accomplished by generating addressing signals in address generator 44 (FIG. 1) as a function of the azimuth and elevation positions of the antenna 16 as controlled by unit 14 and range signals derived from range counter 12.

One exemplary embodiment of the address generator is diagrammed in block form in FIG. 9 to which reference is made herein. It shOuld be recalled that in the foregoing example, each range sweep is 100 miles long, each range bin is 500 yards and that 10 sweeps are transmitted in elevation at each azimuth position. Also, each incremental volume is 4 miles in range, 1 elevation in height and 4° in azimuth. Generator 44 includes an incremental volume range counter 51 which is incremented by one each time a range bin counter 52 reaches its maximum count and is reset. Counter 52 which has a maximum count of 16 is advanced by range bin pulses from range counter 12. As previously assumed, each range bin has a range of 500 yards. Thus 16 range bin pulses represent a range of 4 nautical miles.

Counter 51 is incremented after each group of 16 range bin pulses since the range of each incremental volume is assumed to be 4 nautical miles. The count in counter 51 which reaches a maximum at the end of each range sweep of 100 miles, is used to control a portion of an address register 61 of memory 40. The register 61 and other parts of memory 40 are diagrammed in FIG. 10 to which reference is made herein. Memory 40 includes a storage unit 62 organized as 30 bit words, each word having its unique address location, as is well known in the art of computers.

The entire radar surveillance volume is divided into six sectors each of 60°. Sector 1 covers azimuth range of 0°–59°; sector 2, 60°–119°; sector 3, 120°–179°, sector 4, 180°–239°; sector 5, 240°–299°; sector 6, 300°–359°. Each memory word contains the 5-bit codes for incremental volumes in the same range, same azimuth range and same elevation within each sector.

Thus, each column of 5 bits in unit 62 includes all the codes for all the incremental volumes in one sector. Since each incremental volume is 4 miles in range, 1 elevation in height and 4° in azimuth, each 4° azimuth segment contains 250 incremental volumes. The codes for each 4° azimuth segment are successively stored in unit 62.

As diagrammed in FIG. 10, the first 250 words defining one group contain the codes for incremental volumes in azimuth segment of 0°–3° in the six sectors, while the codes of incremental volumes in the 4° azimuth sectors, 4°–7°, 8°–11° . . . . 56°–59°<⅔ are stored in succeeding words of 250 per group.

As previously indicated, the output of incremental volume range counter 51 (FIG. 9) is used to control part of address register 61 (FIG. 10) to control which word is addressed. In addition to counter 51, the address generator 44 (FIG. 1) includes an elevation counter 53 (FIG. 9) which has a maximum count up to 9 and is reset for a total count of 10 (including 0). The counter 53 includes flip flops F63 to F60 with the flip flop F60 representing the least significant bit of the count. The count therein is advanced in response to dead time pulses supplied by antenna system 14 (FIG. 1) as the antenna elevation is changed from one elevation such as EL1 [FIG. 2(b)] to another. Thus, at each antenna azimuth position, a full count is reached in counter 53 which is reset by an azimuth change pulse from unit 14 (FIG. 1) when the antenna is turned to a new aziMuth position assumed before to be at 1° azimuth intervals.

In addition, an azimuth counter 55 (FIG. 9) is used to provide an output to indicate the azimuth segment within which the antenna is positioned. Its (counter 55) count is advanced in response to 4° pulses from antenna unit 14, and is reset after a count of 14 is reached therein for a total count of 15. Counter 55 is also reset by a NORTH pulse when the antenna sweeps across the NORTH direction which is assumed to be 0°. In FIG. 9, the output lines of counters 51, 53 and 55 are shown as single lines. However, in practice each counter has a plurality of lines, the combination of which is used to provide a plurality of binary signals which represent the specific count therein.

The outputs of counters 51 and 53 are supplied to the first 8 bits of address register, while bits 9 through 12 are supplied with the output of counter 55. In practice, the output or count of counter 55 controls which group of 250 words is addressed, recalling that since each sector is of 60° and each group of words represents an azimuth segment of 4°, there are 15 groups of words. For example, when the count in counter 55 is 0, the first group 0°–3° is addressed. Within the group, a word is addressed as a function of the counts in counters 51 and 53. When the count in counter 53 is 0, the first subgroup of 25 words is selected with the specific word which is actually addressed or selected depending on the count of counter 51. Thus, as the antenna scans the surveillance volume, the words in memory are read out in real time. The entire memory is read out as the antenna is rotated by 60° or once each sector.

Each addressed word is read into a 30 bit read register 63 (FIG. 10) whose content is transferred to the logic stage 42 for code updating or to control subtractor 28 to modify the coded video from quantizer 24, as herebefore described. However, since at any given time the antenna is only in one azimuth position in one sector, it is necessary to provide signals to control stage 42 to enable the logic therein to determine in which sector the antenna is positioned, so that only the portion of the word representing the code of an incremental volume in the particular sector and particular azimuth position is operated upon.

Such signals are supplied by flip-flops FF51 through FF56 (FIG. 9) and a sector counter 57, shown in FIG. 9. Briefly, the count in counter 57 is advanced every time the antenna is positioned in a new sector, which is sensed when counter 55 reaches a maximum count and is reset. Thus, when the count of counter 57 is 0 through 5, the antenna is in sectors 1 through 6 respectively. The output of counter 57 is supplied to the set (S) input of the six flip-flops (FF) which are assumed to be of the clocked type. Also like counter 57, the FF's are assumed to be reset by a NORTH pulse supplied by unit 14 each time the antenna completes a radar scan, i.e. a complete revolution. FF51 provides a true (T) output when the count in counter 57 is 0 indicating that the antenna is in sector 1. Similarly, FF52–FF56 provide true outputs when the antenna is in any of sectors 2–6, respectively. These outputs are supplied to stage 42 wherein they are utilized to control which portion of a word supplied thereto from read register 63 (FIG. 10) is to be updated.

From the foregoing description, it should be appreciated that with the arrangement shown in FIGS. 1, 9 and 10, the 5-bit code, representing each incremental volume, can be read out in real time with the incoming coded video from the range bins comprising the volume. It should however be recalled that the updating of the code is performed only during a defined sequence of scans of an update cycle which occurs at fixed intervals, such as one minute. Thus, it is necessary to supply the logic stage 42 with signals indicative of the update cycle and the scans thereof.

Such signals are supplied by an update cycle logic unit 70 (FIG. 1) which is diagrammed in FIG. 11 as a radar scan counter of a maximum count of six (0–5). The counter is incremented by NORTH pulses from unit 14. Thus, after each complete radar scan or antenna revolution, the counter 70 is incremented by one and is reset to 0 when the count therein is five (5) and a NORTH pulse is supplied thereto. Recalling that a radar scan is completed in ten seconds, the counter 70 is reset to 0 once every minute which is assumed to define the interval between update cycles.

In operation, a plurality of outputs of counter 70 are utilized to define the first, second and third scans of each update cycle. Scan 1 occurs when the count in counter 70 is 0, represented by all the outputs $F_{41}$, $F_{42}$ and $F_{43}$ being false, hereafter represented by $\overline{F}_{41}$, $\overline{F}_{42}$, $\overline{F}_{43}$, while scans 2 and 3 occur when the counts in counter 70 are 1 and 2, represented by $F_{41}$, $\overline{F}_{42}$, $\overline{F}_{43}$ and $F_{41}$, $F_{42}$ and $\overline{F}_{43}$, respectively. These signal combinations are utilized in the logic stage 42 to control its mode of operation during each one of the three scans of an update cycle.

Figure 13:
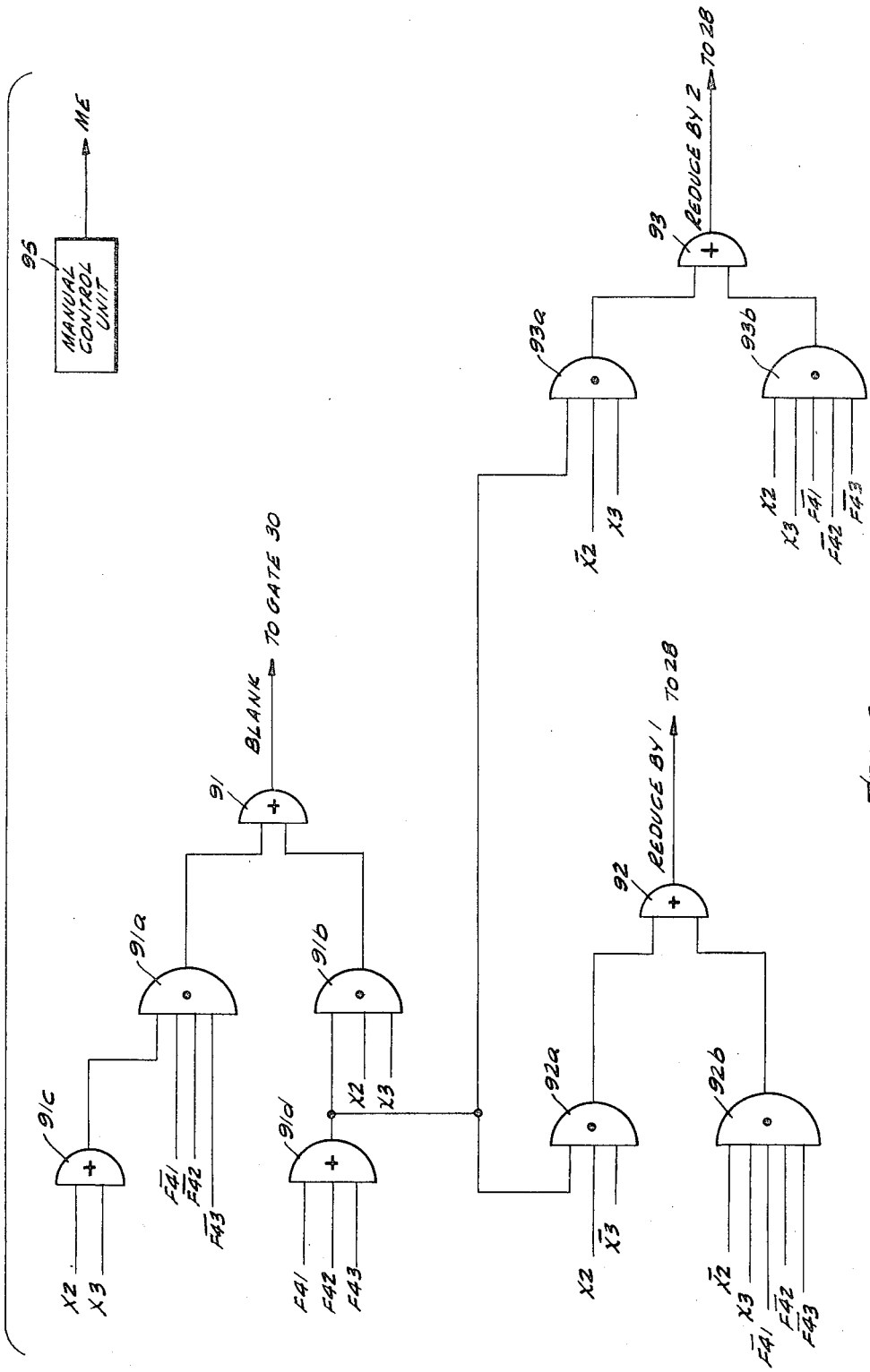

Reference is now made to FIGS. 12 and 13 which are block diagrams of gates in the logic stage 42, used to control the subtractor 28 and gate 30 in accordance with the teachings herebefore disclosed. In FIG. 12 are diagrammed five groups of gates, each including one 6-input OR gate and six 2-input AND gates. The outputs of OR gates 82 through 84 are designated as $X_2$ through $X_4$ respectively. The inputs to the various AND gates are from sources as shown. All the input designations with an R indicate bits of the read register 63. It is assumed that bits $F_{1R}$ through $F_{5R}$, $F_{6R}$ through $F_{10R}$, $F_{11R}$ through $F_{15R}$, $F_{16R}$ through $F_{20R}$, $F_{21R}$ through $F_{25R}$ and $F_{26R}$ through $F_{30R}$, contain 5 bit codes from sectors 1 through 6 respectively, with the smallest bit number in each group (such as $F_{1R}$, $F_{6R}$, etc.) storing the least significant digit (LSD). The inputs $F_{51}$–$F_{56}$ represent the outputs of FF's 51 through 56 respectively, previously described in conjunction with FIG. 9. At any given time, only one FF has a true output, the particular FF depending on the sector in which the antenna is located. It should thus be appreciated that even though as each word is read out from memory, six 5-bit codes are supplied to the AND gates in FIG. 12, the outputs of gates 82 through 84 represent only one of the six codes.

The selected code in the form of outputs $X_2$ through $X_4$ are supplied together with the scan-defining signals $F_{41}$, $F_{42}$ and $F_{43}$ from counter 70 (FIG. 11) to a plurality of gates shown in FIG. 13. Therein the bar (—) above any input designation indicates a complementary signal. The gates in FIG. 13 include three OR gates 91, 92 and 93. When the output of gate 91, which is connected to gate 30, is true, it closes gate 30 (FIG. 1) to inhibit the supply of target reports to utilization device 29. Similarly, the outputs of gates 92 and 93 are supplied to the subtractor 28. The latter subtracts 1 or 2 from the coded video from quantizer 26 (FIG. 1) when the output of 92 or 93, respectively, is true. The inputs to gate 91 are supplied through AND gates 91a and 91b and OR gates 91c and 91d, while the inputs to gates 92 and 93 are respectively supplied through AND gates 92a and 92b and 93a and 93b.

The operation of the logic circuits shown in FIGS. 12 and 13 may be summarized by the following logic equations:

OUTPUT GATES $X_2 = F_{51}F_{2R}+F_{52}F_{7R}+F_{53}F_{12R}+F_{54}F_{17R}+F_{55}F_{22R}+F_{56}F_{27R}$ $X_3 = F_{51}F_{3R}+F_{52}F_{8R}+F_{53}F_{13R}+F_{54}F_{18R}+F_{55}F_{23R}+F_{56}F_{28R}$ $X_4 = F_{51}F_{4R}+F_{52}F_{9R}+F_{53}F_{14R}+F_{54}F_{19R}+F_{55}F_{24R}+F_{56}F_{29R}$

Blank
Output $X_{91} = \overline{F}_{41}\overline{F}_{42}\overline{F}_{43}(X_2+X_3)+X_2X_3(F_{41}+F_{42}+F_{43})$.
Reduce
by 1 (3 db) $X_{92} = \overline{F}_{41}\overline{F}_{42}\overline{F}_{43}(\overline{X}_2X_3) + X_2\overline{X}_3(F_{41}+F_{42}+F_{43})$.
Reduce
by 2 (6 db) $X_{93} = \overline{F}_{41}\overline{F}_{42}\overline{F}_{43}(X_2X_3)+\overline{X}_2X_3(F_{41}+F_{42}+F_{43})$. In the foregoing expressions, $X_{91}$, $X_{92}$ and $X_{93}$ represent the outputs of gates 91, 92, and 93, respectively.

The gates in FIGS. 12 and 13 only perform the logic functions necessary to provide the control signals for subtractor 28 or gate 30. The logic stage 42 includes additional gates whose function is to control the code which is rewritten into memory as a function of the code read out and the presence of a target report during a particular one of the scans of each update cycle. This aspect of the invention has been previously described in conjunction with FIGS. 6, 7 and 8.

The logic functions which are to be performed for each 5-bit code which is read out are based on the relationships herebefore explained. The following equations are derived from the requirements of FIGS. 6, 7 and 8 and are mechanized in the logic stage 42 of FIG. 1. An exemplary list of logic functions for the code of sector 1 follows:

Set $F_{45} = 4°$ pulse
Reset $F_{45} =$ Dead Time $(F_{63}\overline{F}_{62}\overline{F}_{61}\overline{F}_{60})$
Set $F_{1W} = \overline{F}_{51}F_{1R}+F_{51}[\overline{F}_{41}\overline{F}_{42}\overline{F}_{43}[F_{1R}+D(F_{2R}+F_{3R}(\,)]\overline{F}_{5R}$
$+\overline{F}_{5R}F_{51}[\overline{F}_{41}\overline{F}_{42}\overline{F}_{43}F_{1R}]+F_{51}[\overline{F}_{41}\overline{F}_{42}\overline{F}_{43}F_{4R}\overline{F}_{3R}\overline{F}_{2R}F_{1R}]\overline{F}_{5R}F_{45}$
$+F_{51}\overline{F}_{5R}F_{1R}F_{51}ME+F_{51}\overline{F}_{5R}[\overline{F}_{41}\overline{F}_{42}\overline{F}_{43}F_{1R}]\overline{F}_{45}$
$+F_{51}(\,\overline{F}_{43}+\overline{F}_{42}F_{41})\,F_{1R}$
Reset $F_{1W} =$ Set $\overline{F}_{1W}$
Set $F_{2W} = \overline{F}_{51}F_{2R}+F_{51}\overline{F}_{5R}[\overline{F}_{41}\overline{F}_{42}\overline{F}_{43}F_{2R}]$
$+F_{51}\overline{F}_{5R}[\overline{F}_{41}\overline{F}_{42}\overline{F}_{43}F_{2R}]$
$+F_{51}\overline{F}_{5R}F_{45}[\overline{F}_{41}\overline{F}_{42}\overline{F}_{43}(F_{1R}F_{2R}\overline{F}_{4R}+F_{1R}\overline{F}_{2R}\overline{F}_{3R}F_{4R}+F_{3R}F_{4R}$
$+\overline{F}_{1R}\overline{F}_{2R}F_{3R}F_{4R})]+F_{51}\overline{F}_{5R}F_{2R}+F_{51}ME$
$+F_{51}\overline{F}_{5R}F_{45}F_{41}F_{42}\overline{F}_{43}F_{2R}+F_{51}F_{2R}(F_{43}+F_{42}F_{41})$
Reset $F_{2W} =$ Set $\overline{F}_{2W}$
Set $F_{3W} = \overline{F}_{51}F_{3R}+F_{51}\overline{F}_{5R}[\overline{F}_{41}\overline{F}_{42}\overline{F}_{43}\overline{F}_{44}F_{3R}]$
$+F_{51}\overline{F}_{5R}[\overline{F}_{41}\overline{F}_{42}\overline{F}_{43}\overline{F}_{44}F_{3R}]$
$+F_{51}\overline{F}_{5R}[\overline{F}_{41}\overline{F}_{42}\overline{F}_{43}\overline{F}_{44}(F_{3R}F_{4R}+F_{2R}F_{3R}\overline{F}_{4R}+F_{2R}F_{4R}$
$+F_{1R}F_{3R}(\,]+F_{51}\overline{F}_{5R}F_{3R}+F_{51}ME$
$+F_{51}\overline{F}_{5R}F_{45}F_{41}F_{42}\overline{F}_{43}F_{3R}+F_{51}F_{3R}(F_{43}F_{42}F_{41})$
Set $F_{4W} = \overline{F}_{5R}F_{51}[\overline{F}_{41}\overline{F}_{42}\overline{F}_{43}\overline{F}_{44}(F_{4R}+D)]+F_{51}ME+F_{51}\overline{F}_{5R}F_{4R}$
Reset $F_{4W} =$ Set $\overline{F}_{4W}$
Set $F_{5W} =$ Set $\overline{F}_{5W}F_{51}+F_{51}ME$
Reset $F_{5W} =$ Set $\overline{F}_{5W}+F_{51}ME$ In the foregoing equations, $F_{1W}$–$F_{5W}$ represent the first 5 bits of write register 64 into which the codes for sector 1 are written during each scan of the update cycle. Also, in the equations, the letter D represents detection, i.e. a target report from the correlator 26, and $F_{45}$ represents a true output from a FF 45, shown in FIG. 9. FF 45 is set each time the count in counter 55 is incremented and is reset whenever counter 53 is reset.

It should be apparent to those familiar with the art of logic design that the foregoing equations express the logic necessary to implement the updating of the codes for incremental volumes in sector 1 (0°–59°) in accordance with the teachings hereinbefore described in conjunction with FIGS. 5, 6, 7 and 8. The logic is actually implemented by gates interconnected to perform the desired relationship. Such techniques are well known in the art and therefore the description of the various gates is not included herein.

ME in the equations indicates a true output from a manual control unit designated by numeral 95 in FIG. 13. Its function is to override the automatic code updating cycle and rewrite into memory a code which is manually, rather than automatically, determined. Techniques to produce a manual entry which overrides the automatic cycles are well known in the art, and therefore the manual control unit is diagrammed in FIG. 13 in simplified block form.

Heretofore, the invention has been described in conjunction with circuitry which controls the target detection criteria for each incremental volume of the radar surveillance as a function of a 5-bit code representing the target detection history of the volume. The code is updated during each of a sequence of update cycles. The code is used to modify the coded video received from each range bin of the incremental volume by subtracting 1 or 2 from the coded video and thereby decrease the detection sensitivity or increase or tighten the detection criteria.

In another embodiment of the invention, the detection criteria is controlled as a function of the rate at which target reports are produced by the correlator 26, as well as a function of the rate at which coded video above a certain level are provided by quantizer 24. This aspect of the invention may best be described in conjunction with FIG. 14. Therein, the video quantizer 24, video correlator 26 and subtractor 28 are again shown in block form. The circuitry required to determine the rate of target reports includes a miss counter 101 and a target rate counter 102. The output of the video correlator 26, which is assumed to be at a "1" state when a target report is produced, is supplied to counter 102 and to one input of an AND gate 104 through an inverter 106. The other input of gate 104 responds to a range bin pulse, and the output of gate 104 is connected to the input of the miss counter 101.

Basically, in the absence of a target report from correlator 26, i.e. when a miss is provided thereby, counter 101 is incremented by one for each range bin pulse. Counter 101 is connected to be reset at the count of 1000 at which time it supplies a pulse to counter 102, decrementing the count therein. However, when a target report is produced, counter 102 is incremented by a count which depends on the number of meaningful targets which are to be expected in each radar scan of 360°. For example, if the expected number of targets is 180, five targets are expected in each 10° sector. And since in a 10° sector, there are 10×10×400=40,000 range bins, the count in counter 102 is increased by 8 for each target report. Thus, during each 10° sector for the five targets, the count in counter 102 should increase to 40. But the misses in the sector counted by counter 101 would reduce the count to about zero since counter 101 would overflow about 40 times during the scanning of the 10° sector. Consequently, if the rate at which targets are received is as expected, i.e. five targets per 10° sector, the count in counter 102 would be about zero. If however, the target rate is double the expected rate, 10 targets are received per 10° sector so that the count in counter 102 increases to 40. Thus, the counter in counter 102 is indicative of target rate. The count may be used to directly control subtractor 28 so that when the count exceeds a given value, the coded video from quantizer 24 is modified, by subtracting 1 from each 3-bit hit code.

In a preferred embodiment however, the count in counter 102 is supplied to a target rate logic circuit 105 whose output, when true or in a "1" state, causes subtractor 28 to subtract a 1 from each 3-bit hit code. Circuit 105 is provided with a second input which represents the rate at which coded video above a certain value or level are supplied by quantizer 24 to subtractor 28.

Recalling from FIG. 3 that coded video from quantizer 24 may be any one of eight 3-bit codes, circuitry is included in the arrangement shown in FIG. 14 to determine the rate at which coded video of a code 3 hit (011) or greater are supplied by the quantizer. When this rate exceeds a given value, a true signal is supplied to logic circuit 105 for use therein together with the count from target rate counter 102 to determine whether a 1 should be subtracted from the coded video supplied to correlator 26.

The circuitry includes a digital compare circuit 107 which provides a true output whenever the coded video from quantizer 24 is a code 3 hit (011) or greater (see FIG. 3). Its output is clocked into a shift register 109 whose 5 bits are designated B1 through B5. The output of B3 is supplied to an incrementing input of a counter 110 and through a decrementing input of counter 110 through an inverter 112. The count in counter 110 is incremented whenever B3 stores a true signal representing a true output from circuit 107 which in turn represents a code 3 hit or greater from quantizer 24.

Shift register 109 and four logic gates, including AND gates 113, 114 and 115 and OR gate 116 are used to inhibit the incrementing of counter 110 when three successive coded video are code 3 hits or greater. The reason that the counter 110 is inhibited from counting is that such three successive coded video from three successive range bins are more likely due to a large body of clutter rather than a meaningful target.

From the foregoing, it should thus be appreciated that the count in the counter 110 represents the rate at which large coded video is supplied by quantizer 24 while the count in counter 102 represents the rate at which target rates are produced by correlator 26. The counts in the two counters are supplied to the logic circuit which produces an output, causing subtractor 28 to subtract a 1 from the coded video supplied to correlator 26 only when the counts in the two counters are of known relationships. For example, in on embodiment, logic circuit was operated to cause subtractor 28 to subtract a 1 when the count in counter 110 indicated a high rate of twice the expected rate. Also a 1 was subtracted when the rate of coded video was normal but the rate of target report was three times the expected rate such as for example 540 target reports per 360° scan.

There has accordingly been shown and described herein a novel system for automatically controlling the detection criteria of targets in a radar system. The criteria is controlled on the basis of the history of detection of targets in each incremental volume of the total radar surveillance volume and/or on the basis of the rate at which large video returns are received or the rate at which target reports are produced as compared with an expected target rate.

It should be appreciated that in light of the foregoing disclosure, those familiar with the art may make modifications and/or substitute equivalents in the arrangements as shown without departing from the true spirit of the invention. Therefore, all such modifications and/or equivalents are deemed to fall within the scope of the invention as defined in the appended claims.

I claim:

1. An automatic target detection criteria control system for use in a radar receiving system of the type including a radar receiver for receiving with a surveillance antenna return signals from a plurality of range bins in the surveillance volume as said antenna is rotated in azimuth and directed in a plurality of different elevations at each azimuth position, said radar receiving system further including quantizing means responsive to said return signals to produce quantized video returns from each of said range bins and means for processing said quantized video returns to produce target-detection-indicating signals suppliable to target-detection utilization means, said radar receiving system further including means providing a range signal indicative in real time of the range of the range bin from which return signals are received and azimuth and elevation signals indicative of the azimuth and elevation positions of said antenna, said automatic target-detection criteria control system comprising:

first means responsive to range, azimuth and elevation signals from said radar receiving system for generating address signals defining incremental volumes in the radar surveillance volume surveyed by said antenna, each volume being of a selected range, which includes the range of an integral number of range bins, each volume having a width of a preselected azimuth segment and a height of a selected number of elevations, said first means providing the addressing signals defining an incremental volume as said antenna is in the azimuth segment and elevation of the incremental volume and the return signals received by said radar receiving means are from the particular range included in the incremental volume;

memory means including means for storing a multibit code for each of said incremental volumes, said memory means further including a read register and an address register responsive to said address signals for reading into said read register the multibit code of the incremental volume defined by said address signals;

logic means responsive to the code in said read register for selectively controlling the amplitudes of quantized video returns supplied to said means for processing as a function of the code value from said memory means.

2. An automatic target detection criteria control system as recited in claim 1 further including gating means for inhibiting the supply of target detection indicating signals from said means for processing to said target-detection utilization means when the code from said memory means has a predetermined value.

3. An automatic target detection criteria control system as recited in claim 1 further including means defining a sequence of code update cycles and means for supplying said target-detection indicating signals from said means for processing to said logic means, said logic means including gating means for updating during each update cycle the code in said read register as a function of the code characteristics and a target-detection indicating signal from said means for processing, whereby the code associated with each incremental volume which is read out between update cycles is a function of the history of target-detection in range bins in the incremental volume, said memory means including a write register responsive to signals from said logic means for storing the updated code in said means for storing.

4. An automatic target detection criteria control system as recited in claim 3 wherein said means defining a sequence of update cycles includes a multibit counter which is incremented at preselected intervals, and means coupling said logic means to said counter to provide said logic means with update cycle-defining signals when the count in said counter is of predetermined values.

5. An automatic target detection criteria control system as recited in claim 3 wherein said means defining a sequence of update cycles includes a resettable multibit counter with a selected maximum count;

means providing said counter with input signals at a controlled rate, which substantially equals the rate of rotation of said antenna, the time required for said counter to reach its maximum count defining a period between successive update cycles, and means coupling said logic means to said counter to provide said logic means with three successive signals defining three successive phases of each update cycle when the count in said counter is of three successive values.

6. An automatic target detection criteria control system as recited in claim 3, said system further including means for defining a sequence of phases within each update cycle, said logic means including means responsive during each phase to the code read out from said read register for selectively modifying the amplitudes of the quantized video returns supplied to said means for processing as a function of the value of the code and the phase within the update cycle, said gating means of said logic means restoring at the end of each phase a code in said means for storing.

7. An automatic target detection criteria control system as recited in claim 6 wherein the gating means of said logic means includes first means to develop selected values of the code storable at the end of each update cycle include, in which a first code value is indicative of the absence of a target-detection-indicating signal from said means for processing during the last update cycle.

8. An automatic target detection criteria control system as recited in claim 7 wherein said gating means of said logic means includes second means to develop said selected code values to include a second code value indicative of a target-detection-indicating signal during an update cycle preceding the last cycle and a target-detection-indicating signal during the last cycle in spite of a modification of the amplitude of the quantized video returns supplied to said means for processing, a third code value indicative of target-detection-indicating signals during three successive update cycles, a fourth code value indicative of target-detection-indicating signals during three successive update cycles and a fifth code value indicative of target-detection-indicating signals during four successive update cycles.

9. An automatic target detection criteria control system as recited in claim 8 wherein said logic means includes means responsive to said code values for controlling the amplitudes of the quantized video returns supplied to said means for processing as a function of said code values.

10. An automatic target detection criteria control system as recited in claim 9 wherein said logic means in response to said third and fourth code values reduces the amplitude of the quantized video returns by a first and second magnitude respectively, and further including gating means for inhibiting the supply of target-detection-indicating signals from said means for processing to said target-detection utilization means, said logic means controlling said inhibiting gating means to inhibit the supply of target detection indicating signals to said utilization means when the code from said means for storing is of said fifth value.

11. An automatic target detection criteria control system as recited in claim 1 further including counting means responsive to the target detection indicating signals for providing a count indicative of the rate at which said means for processing provide said target-detection-indicating signals; and means responsive to said counting means for selectively controlling the amplitude of the quantized video returns supplied to said means for processing as a function of said count.

12. An automatic target detection criteria control system as recited in claim 1 further including means including counting means responsive to the quantized video returns from said quantizing means for providing a count indicative of the rate at which quantized video returns exceeding a selected amplitude are supplied by said quantizing means.

13. An automatic target detection criteria control system as recited in claim 12 further including target-rate counting means responsive to the target-detection-indicating signals from said means for processing for providing a count which is indicative of the rate of target detection, and means responsive to said count indicative of target detection rate and the count from said counting means which is indicative of the rate at which quantized video returns exceeding a selected amplitude are supplied by said quantizing means, to control the amplitude of the quantized video returns supplied to said means for processing.

14. A detection criteria control system for operation in conjunction with a surveillance radar receiving system, including a surveillance radar antenna rotated in azimuth and controlled to successively receive signals at a plurality of elevations at each of a plurality of azimuth positions said antenna being rotated to complete one revolution defining a radar scan in a selected interval, said radar receiving system including a source of range bin defining signals, a receiver and quantizing means for providing quantized video returns from the signals received by said antenna from each range bin, and means for processing the quantized video returns to provide a target report signal from a range bin to target report utilization means only when the amplitude of the quantized video returns from the range bin and from range bins related in azimuth and elevations are of preselected amplitudes, said detection criteria control system comprising:

first means responsive to said range bin defining signals and signals indicative of the azimuth and elevation of the radar antenna for generating, in real time, sets of addressing signals, each set defining an incremental volume of the volume surveyed by said antenna being generated as said receiving system produces quantized video returns for range bins included in the incremental volume;

memory means for storing a code for each incremental volume of the radar surveillance volume;

a read register;

an address register responsive to a set of addressing signals from said first means for controlling said memory means to read the code of the incremental volume defined by the set of addressing signals into said read register; and means including logic means responsive to at least the code in said read register for controlling the amplitudes of the quantized video returns from all the range bins included in the incremental volume associated with the read out code as a function of the code characteristics.

15. In a radar receiving system of the type including means developing quantized video returns for signals returned from each range bin of the radar surveillance volume and means for correlating the quantized video returns to provide target reports, the improvement comprising:

means for storing a target-detection-history indicating code for each multirange bin incremental volume of said surveillance radar;

means for utilizing each code to control the quantized video returns from the range bins of the incremental volume associated with said code; and means for updating during each of a sequence of update cycles the code of each incremental volume as a function of the code characteristics and a target report from said correlating means provided during the update cycle for any of the range bins in the incremental volume.

16. In the radar receiving system as recited in claim 15 wherein said means for storing includes means to provide the code at the beginning of an update cycle to be representative of the history of detection of targets in any of the range bins of an incremental volume associated with said code during preceding update cycles in said sequence.

17. In the radar receiving system as recited in claim 16 wherein the quantized video returns from each range bin are represented by a multibit number whose numerical value is indicative of the peak of the video returns with respect to a preselected threshold level, said utilizing means subtracting a first numerical quantity from the quantized video returns of all range bins in an incremental volume when the code represents target detection in two successive update cycles and a second numerical quantity larger than said first, when the code represents target detection in three successive update cycles.

18. In the radar receiving system as recited in claim 17 further including means for blanking the supply of target reports from said receiving system from range bins in a given incremental volume when the code associated with said volume is indicative of target detection in a preselected number of successive update cycles.

19. In the radar receiving system as recited in claim 15 further including means for modifying the quantized video returns as a function of the rate of target reports from said correlating means.

20. In the radar receiving system as recited in claim 15 further including means for modifying the quantized video returns supplied to said correlating means as a function of the rate at which quantized video returns above a selected value are developed.

* * * * *